United States Patent [19]

Bartels et al.

[11] 4,061,264

[45] Dec. 6, 1977

[54] METHOD FOR PRODUCING HELICAL SEAM PIPES

[75] Inventors: Werner Bartels; Heinz Krakow, both of Hamburg, Germany

[73] Assignee: Blohm & Voss AG, Hamburg-Steinwerder, Germany

[21] Appl. No.: 683,076

[22] Filed: May 4, 1976

[30] Foreign Application Priority Data

May 9, 1975 Germany .............................. 2520610

[51] Int. Cl.$^2$ ............................................. B21C 37/08
[52] U.S. Cl. .................................................. 228/145
[58] Field of Search ....................... 228/145, 165, 17.7

[56] References Cited

U.S. PATENT DOCUMENTS

| 3,443,306 | 5/1969 | Meyer .................................... 228/165 |
| 3,861,574 | 1/1975 | Hoffmann et al. ............. 228/17.7 X |

FOREIGN PATENT DOCUMENTS 519,248   12/1955   Canada .................................. 228/165

819,939   11/1951   Germany .............................. 228/165

Primary Examiner—James L. Jones, Jr.
Assistant Examiner—James G. Smith
Attorney, Agent, or Firm—Toren, McGeady and Stanger

[57] ABSTRACT

In winding a continuous strip of sheet metal having chamfered edges into a helical seam pipe, the chamfered edges define an inside seam and an outside seam in the pipe. Initially, after forming the pipe, a tack weld is formed in the outside seam and then a finish weld is provided in the inside seam. Next, the pipe is cut into lengths and finally a finish weld is made in the previously tack welded outside seam. The cross sectional area of the inside seam is kept to a minimum and though different thicknesses of strip can be used for forming the pipe, the cross sectional area of the inside seam is maintained a constant over the range of strip thicknesses used to assure that the inside seam is finish welded in as short a time as possible with the pipe moving axially at the highest possible speed.

2 Claims, 8 Drawing Figures

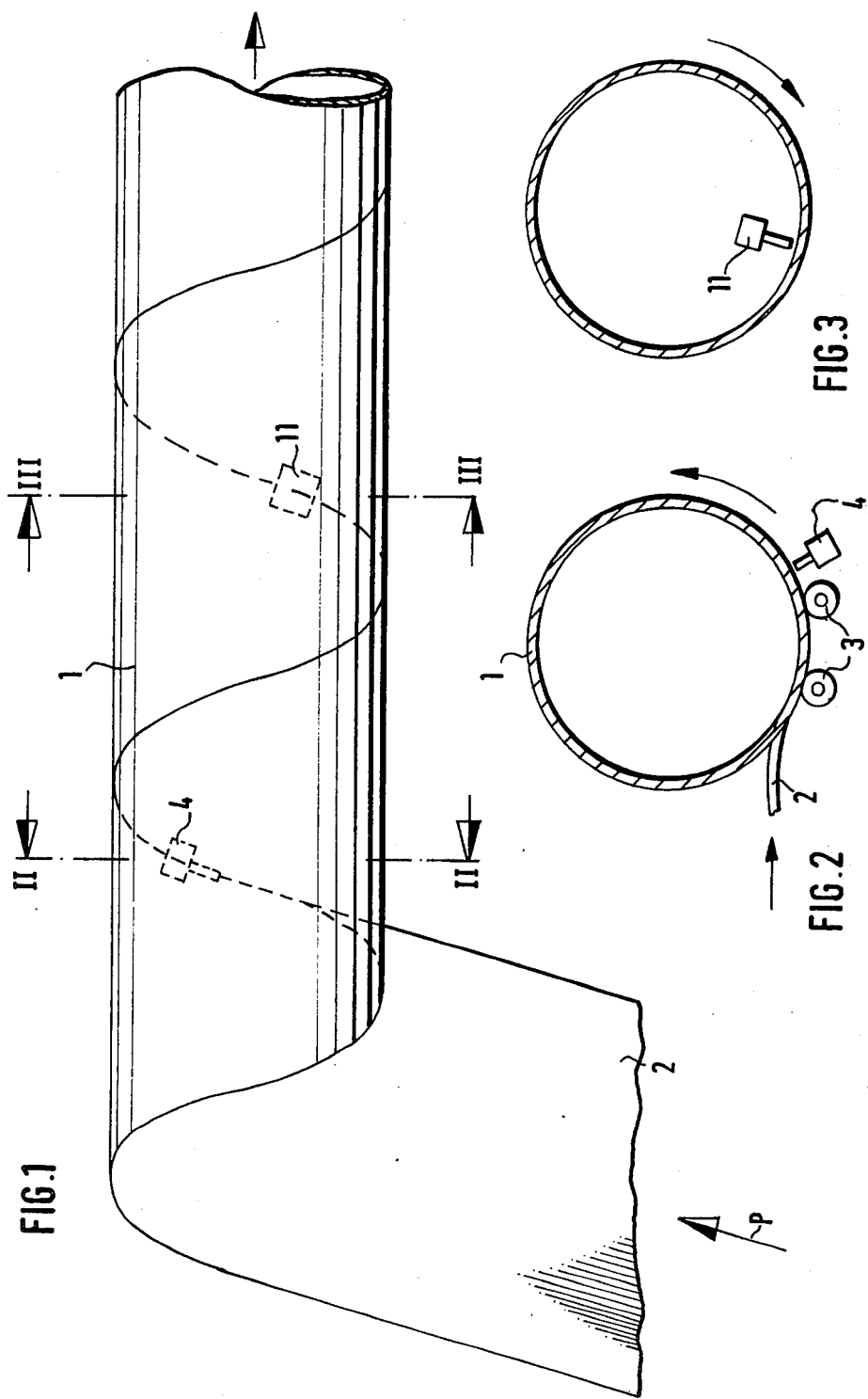

METHOD FOR PRODUCING HELICAL SEAM PIPES

SUMMARY OF THE INVENTION

The present invention is directed to a method of and apparatus for producing helical seam pipe by joining the edges, chamfered on both sides, of a strip of sheet metal continuously fed through a pipe-shaping station, by initially tack welding the outside helical seam, finish welding the inside helical seam, cutting the pipe to length and finish welding the outside seam on a special apparatus separate from the pipe-shaping station.

There has been considerable interest in increasing the rate of production of helical seam pipe.

Increasing the rate of production, however, depends primarily on whether it is possible to increase the welding speed without adversely affecting the quality or integrity of the welded inside and outside seams of the helical joint in the pipe. While in the manufacture of helical seam pipe from a steel strip of a thickness of more than 12 mm it is possible to shape the strip into a pipe in a relatively short time, however, the time interval for the shaping operation is insufficient for producing a finish weld in the inside and outside seams of the pipe.

As a result, it has become accepted practice to tack weld the steel strip after it has been formed into a pipe in the pipe-shaping station, then to cut the pipe into lengths, and finally finish weld the inside and outside seams of the cut lengths on a separate welding stand. With such a method, the rate of production can be considerably increased, note DOS No. 2,028,560.

The problem experienced in such a method involves the extreme difficulty, if not impossibility, of automatically controlling the welding head for the inside seam after severing the pipe to length so that the welding head is exactly positioned above the strip edges to be welded together. Even a slight deviation of the welding head laterally from the weld joint generally leads to a faulty weld which results in the rejection of such a pipe length.

While many attempts have been made to control the position of the welding head centered over the weld joint or seam, a really practical solution has not been found to date.

Once the helical seam pipe has been cut to length before the inside seam is formed on a separate welding stand, the helical shape must, of course, be "reexecuted", so that the rigidly positioned welding head will always be exactly aligned over the inside seam of the rotating pipe which is to be welded. However, the pipe not only rotates about its axis, it also moves in the axial direction with the pipe travelling in a helical path. As has been stated, it is extremely difficult to assure that the welding head is always exactly aligned with the inside seam, accordingly, the quality of the weld deposited is continuously jeopardized.

Therefore, it is the primary object of the present invention to provide a method of and apparatus for assuring the desired increase in the rate of production of helical seam pipe can be attained without any reduction in the integrity of the weld deposited in the inside and outside seams.

In accordance with the present invention, the problems previously experienced are solved by chamfering the inside and outside portions of the strip edges so that the cross sectional area of the inside seam of the pipe is kept as small as possible whereby the inside seam can be welded at the greatest possible strip edge speed with the inside welding head kept stationary. After the strip is shaped as a pipe, first a continuous tack weld is formed in the outside seam and then a finish weld is formed in the inside seam. Following the welding of the inside seam, the pipe is cut to length and the outside seam is finish welded at a separate location.

In this way, the inside seam is completed at the shaping station which retains the strip and the helically wound strip edges which are to be joined together, in a clamped position relative to one another and to the apparatus in the shaping station and, accordingly, in position relative to the inside welding head. The strip shaped as a pipe then moves past the inside welding head which is maintained centered or aligned with the inside seam so that the weld does not require any adjustment after the pipe is cut to length. The tack weld formed in the outside seam serves as a support and also as a weld bath seal in the welding of the inside seam.

The finish welding of the outside seam at a separate welding stand, after the pipe has been cut to length, is much easier to effect, as compared to the welding of the inside seam, because an efficient supervision and a visual and manual control and correction of the welding procedure and of the position of the outside welding head relative to the outside seam is possible. This feature is of particular importance because the relatively large cross sectional area of the outside seam is welded as a so-called multi-layer weld seam, which, as is known, affords a fine crystalline structure, that is, a weld structure of high strength.

The above advantages are particularly notable when the welding procedure is used for forming pipe from different thicknesses of sheet metal strip with the cross sectional area of the inside seams being maintained a constant regardless of the thickness of the strip while the cross sectional area of the outside seam increases in relationship to the increased strip thickness.

In the apparatus used for carrying out the method described above, the welding head which tack welds the outside seam is located immediately adjacent the position at which the strip enters the shaping station and contacts the trailing edge of the strip already formed as a pipe.

Relating the position of the welding head forming the tack weld to the face of a clock, the head is located approximately in the 6 o'clock position with the incoming strip contacting the previously pipe-formed strip at about the same position. The imaginary face of the clock must be considered as extending in a plane transversely of the pipe axis and viewed in the direction of travel of the pipe. In this position of the outer welding head, the tack weld is performed with certainty at a location at which the shaping of the strip into a pipe form is practically completed. Another feature of the invention is the location of the welding head for the inside seam at least one full strip turn in the direction of movement of the pipe from the welding head which tack welds the outside seam. In other words, the welding head for the inside seam is spaced approximately the pitch distance of the helical seam formed in the pipe from the head performing the tack weld. With this arrangement it is assured, on one hand, that the tack weld has sufficiently cooled to provide the desired supporting function. On the other hand, it is advantageously assured that the welding head for the deposition of the finish weld in the inside seam can be arranged with such a lead that, even at a relatively high welding rate, the melt or weld bath remains in place and does not run off in the direction of the pipe curvature. Generally, the welding head for the inside seam, which has a much greater cross sectional area than the tack weld formed in the outside seam, is welded in a single operation with two or more electrodes and is located in approximately the 7 o'clock position when the transverse cross section of the pipe is viewed in the direction in which the pipe moves away from the shaping station. Advantageously, the tack weld is carried out as a shield-gas weld and the finish welds are performed by the submerged arc method.

The welding head for producing the finish weld in the outside seam is located on a separate welding stand and is positioned relative to the movement of the pipe so that the weld is solidified by the time it has reached approximately the 12 o'clock position after leaving the welding head.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

In the drawing:

FIG. 1 is a plan view showing a sheet metal strip being formed as pipe;

FIG. 2 is a sectional view taken along the line II—II in FIG. 1;

FIG. 3 is a sectional view taken along the line III—III in FIG. 1;

DETAILED DESCRIPTION OF THE INVENTION

Figure 4:
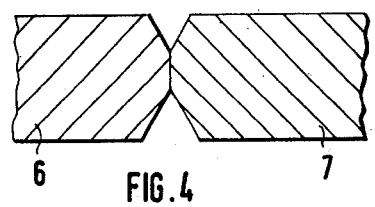
FIGS. 4–7 are partial cross sectional views showing the formation of the welds in the inside and outside seams formed by the abutting edges of the strip forming the pipe.

As shown in FIG. 1, a sheet metal strip 2 is being continuously fed into the shaping station of a helical seam pipe forming unit, not shown, moving in the direction of the arrow P so that, as shown in FIG. 2, immediately after the strip passes the shaping rolls 3 engaging the outside of the strip and an inner bending roll, not shown, it moves into the range of a first welding head 4, positioned substantially stationary, after the leading edge 6 of the incoming strip contacts the trailing edge 7 of the strip which has already been shaped as a pipe 1. Note in FIG. 4 the chamfered surfaces of the abutting edges of the strip as they approach the first welding head 4. As viewed in FIG. 4, the upper surface is the inside surface of the pipe and the lower surface is the outside surface of the pipe.

Figure 5:
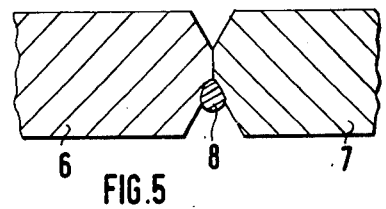
Figure 6:
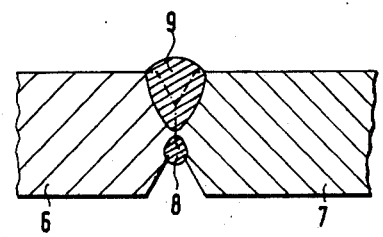
Figure 7:
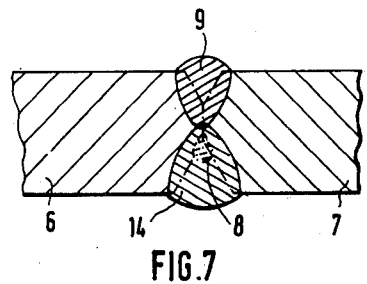

The welding head 4 is located approximately in the 6 o'clock position or, as viewed in FIG. 2, between the 5 and 6 o'clock positions and this head tack welds the strip edges 6 and 7 together. In FIG. 5, the tack weld 8 is shown in the base of the outside seam between the two strip edges. The tack weld serves as a support and as a seal for the weld 9 in the inside seam, note FIGS. 6 and 7.

Based on the embodiment of the invention shown in FIG. 1, the finished weld in the inside seam is produced by a welding head 11 spaced in the direction of movement of the pipe from the shaping station at which the welding head 4 is located. Preferably, the spacing between the welding head 4 and welding head 11 is about the pitch dimension of the helical weld seam or the dimension traversed by one full strip turn in the pipe. Further, as viewed in FIG. 3, the welding head 11 is located in the 7 o'clock position with the pipe rotating past it toward the 6 o'clock position.

Figure 8:
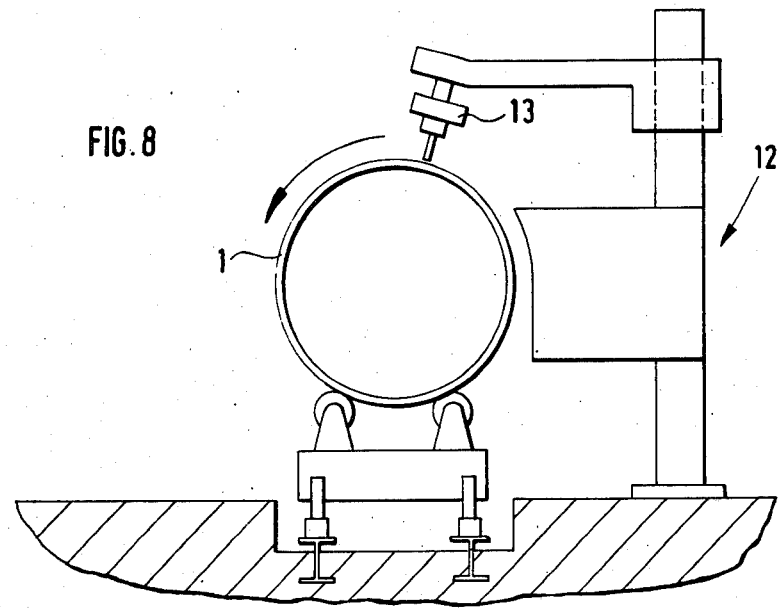
FIG. 8 is an end view of a separate welding stand for welding the outside seam of a cut length of pipe.

The helical seam pipe 1, as shown in FIG. 1, having traversed both the welding head 4 and the welding head 11 has a continuous tack weld 8 in the outside seam and a finish weld in the inside seam. Downstream of the direction of the movement of the pipe from the welding head 11, the pipe is cut to length and moves from the pipe forming unit to a separate welding stand, note FIG. 8. In the welding stand 12, a third welding head 13 is positioned adjacent the crown of the pipe so that the weld bath formed in the outside seam solidifies by the time it reaches approximately the 12 o'clock position with the pipe rotating helically in the welding stand. With the production of the finished weld 14 in the outside seam, note FIG. 7, the welded helical seam pipe is completed.

What is claimed is:

1. A method of producing welded helical seam pipe from a continuous strip of sheet metal, comprising the steps of chamfering the top and bottom surfaces of both edges of said strip of sheet metal, continuously feeding said strip of sheet metal to a pipe shaping station, helically winding the strip to form an axially extending pipe with the edges of the strip in abutting relation thereby forming an inside chamfered weld seam and an outside chamfered weld seam, shaping the chamfered surface of said edges so that the cross section of said inside chamfered weld seam can be welded at the maximum speed of travel of said strip, tack welding the outside chamfered edges together at a location in the winding of said strip into a pipe adjacent the point of initial contact of the strip edges into abutting relation so that only a portion of the welding of the outside seam is effected forming a helically extending joint between said abutting edges of the strip as the pipe is moving from the pipe shaping station in the axial direction thereof, finish welding the inside seam in said pipe forming station at a stationary location therein axially spaced from the location of said tack welding, severing the pipe having the tack welded outside chamfered seam and the finish welded inside chamfered seam, and thereafter finish welding the outside tack welded seam.

2. The method as set forth in claim 1, comprising the further step of maintaining the cross sectional area size of the inside seam so that the cross sectional area of the inside seam is maintained constant with the cross sectional area of the outside seam varying in accordance with the thickness of the sheet metal strip, thereby enabling the forming of pipe from various thicknesses of sheet metal strip.

* * * * *